United States Patent
Chung

(10) Patent No.: US 8,265,557 B2
(45) Date of Patent: Sep. 11, 2012

(54) MOBILE TERMINAL CAPABLE OF BEING CONNECTED TO AUDIO OUTPUT DEVICE USING SHORT-RANGE COMMUNICATION AND METHOD OF CONTROLLING THE OPERATION OF THE MOBILE TERMINAL

(75) Inventor: Ji Hang Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 12/752,987

(22) Filed: Apr. 1, 2010

(65) Prior Publication Data

US 2011/0081859 A1  Apr. 7, 2011

(30) Foreign Application Priority Data

Oct. 6, 2009  (KR) .................. 10-2009-0094776
Oct. 14, 2009  (KR) .................. 10-2009-0097795

(51) Int. Cl.
*H04B 7/00* (2006.01)

(52) U.S. Cl. .................. 455/41.2; 455/569.1

(58) Field of Classification Search .................. 455/41.2, 455/569.1
See application file for complete search history.

(56) References Cited

U.S. PATENT DOCUMENTS

| 2008/0051919 A1* | 2/2008 | Sakai et al. ................ 700/94 |
| 2009/0061769 A1* | 3/2009 | Zimbric et al. ............ 455/41.2 |
| 2010/0100924 A1* | 4/2010 | Hinton ...................... 726/1 |

\* cited by examiner

*Primary Examiner* — Tuan H Nguyen
(74) *Attorney, Agent, or Firm* — Lee, Hong, Degerman, Kang & Waimey

(57) ABSTRACT

A mobile terminal and a method of controlling the operation of the mobile terminal are provided. The method includes receiving a first key signal for controlling a first profile and an audio playback operation from an audio output device, the first profile being a profile for playing audio data; connecting the mobile terminal to the audio output device using the first profile; and suspending the processing of a command corresponding to the first key signal for a predetermined amount of time. Therefore, it is possible to suspend the processing of a command for a predetermined amount of time during the connection of the mobile terminal to the audio output device and thus to prevent an unwanted operation from being performed.

29 Claims, 11 Drawing Sheets

MOBILE TERMINAL CAPABLE OF BEING CONNECTED TO AUDIO OUTPUT DEVICE USING SHORT-RANGE COMMUNICATION AND METHOD OF CONTROLLING THE OPERATION OF THE MOBILE TERMINAL

CROSS-REFERENCE TO RELATED APPLICATION

This application claims the priority benefit of Korean Patent Application Nos. 10-2009-0094776 and 10-2009-0097795, filed on Oct. 6, 2009 and Oct. 14, 2009, respectively, in the Korean Intellectual Property Office, the disclosures of which are incorporated herein by reference.

BACKGROUND OF THE INVENTION

1. Field of the Invention

The present invention relates to a mobile terminal and a method of controlling the operation of the mobile terminal, and more particularly, to a mobile terminal which can be connected to an audio output device via short-range communication and a method of controlling the operation of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

In the meantime, headsets or earphones are a type of audio output devices that can be worn on the ears of a user and can directly transmit audio signals to the user. There are various types of audio output devices available. With a recent development of various wireless headsets equipped with short-range communication technology such as Bluetooth, the demand for improving the design and structure of such audio output devices so as to enhance wearability has rapidly increased. Audio output devices equipped with short-range communication technology are capable of providing not only an audio output feature but also other various features such as a phonebook feature, a call history feature, a message feature and a file transmission feature.

Such audio output devices as Bluetooth headsets, however, may readily process commands input thereto even in the middle of being connected to mobile terminals and thus may often cause noise or unwanted events. In addition, an automatic system recovery (ASR) may be automatically executed, thereby requiring users to manually cancel the ASR menu in order to escape.

Moreover, Bluetooth provides only limited bandwidths and can thus support data rates of only 3 Mbps at best even when using Enhanced Data Rate (EDR). Thus, if a phonebook feature is used or a call history or a list of messages is searched through with a mobile phone while listening to music from a Bluetooth audio output device connected to the mobile terminal, the output of audio signals may often be undesirably stopped. In order to address this problem, a command to suspend an audio playback operation may be issued from the Bluetooth audio output device to the mobile terminal so that the output of audio signals can be suspended. Then, when the use of the phonebook feature or the search of the call history or the message list is complete, a command to resume the audio playback operation may be issued from the Bluetooth audio output device to the mobile terminal. In this case, however, the mobile terminal may mistakenly consider the command to suspend the audio playback operation as a command to terminate the audio playback operation and may thus terminate the whole audio playback operation. Alternatively, the mobile terminal 100 may continue to generate an audio stream, but the Bluetooth audio output device may not be able to properly receive the audio stream from the mobile terminal 100. As a result, the output of audio signals may not be properly resumed even in response to the command to resume the audio playback operation. In addition, the Bluetooth audio device may malfunction due to a command mistakenly input thereto during the suspension of the audio playback operation.

SUMMARY OF THE INVENTION

The present invention provides a mobile terminal, which can suspend the processing of a command input thereto for a predetermined amount of time while being connected to an audio output device and can thus prevent the occurrence of an unwanted event, and a method of controlling the operation of the mobile terminal.

The present invention also provides a mobile terminal, which can prevent the occurrence of an unwanted event while playing audio data by being connected to an audio output device via short-range communication.

According to an aspect of the present invention, there is provided a method of controlling the operation of a mobile terminal, which is capable of being connected to an audio output device via short-range communication, the method including receiving a first key signal for controlling a first profile and an audio playback operation from the audio output device, the first profile being a profile for playing audio data; connecting the mobile terminal to the audio output device using the first profile; and suspending the processing of a command corresponding to the first key signal for a predetermined amount of time.

According to another aspect of the present invention, there is provided a mobile terminal including a wireless communication unit configured to connect the mobile terminal to an audio output device via short-range communication; and a controller configured to receive a first key signal for controlling a first profile and an audio playback operation from the audio output device, connect the mobile terminal to the audio output device using the first profile and suspend the processing of a command corresponding to the first key signal for a predetermined amount of time, the first profile being a profile for playing audio data.

According to another aspect of the present invention, there is provided a system including an audio output device configured to be equipped with a first key for controlling a first profile and an audio playback operation, the first profile being a profile for playing audio data; and a mobile terminal configured to be connected to the audio output device via short-range communication using the first profile upon receiving a first key signal, which is generated by pressing the first key, from the audio output device and suspend the processing of a command corresponding to the first key signal for a predetermined amount of time.

According to another aspect of the present invention, there is provided a method of controlling the operation of a mobile terminal, the method including connecting the mobile terminal to an audio output device via short-range communication using a first profile for distributing an audio stream and transmitting a predetermined audio stream to the audio output device; if a command to suspend an audio playback operation is received from the audio output device, suspending the transmission of the predetermined audio stream; and displaying a message indicating the suspension of the transmission of the predetermined audio stream on a display module and suspending all user inputs regarding the control of the audio playback operation except for those for terminating the audio playback operation.

According to another aspect of the present invention, there is provided a mobile terminal including a display module; a wireless communication unit configured to connect the mobile terminal to an audio output device via short-range communication; and a controller configured to connect the mobile terminal to the audio output device using a first profile for distributing an audio stream and transmit a predetermined audio stream to the audio output device, wherein, if a command to suspend an audio playback operation is received from the audio output device, the controller suspends the transmission of the predetermined audio stream, and displays a message indicating the suspension of the transmission of the predetermined audio stream on a display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
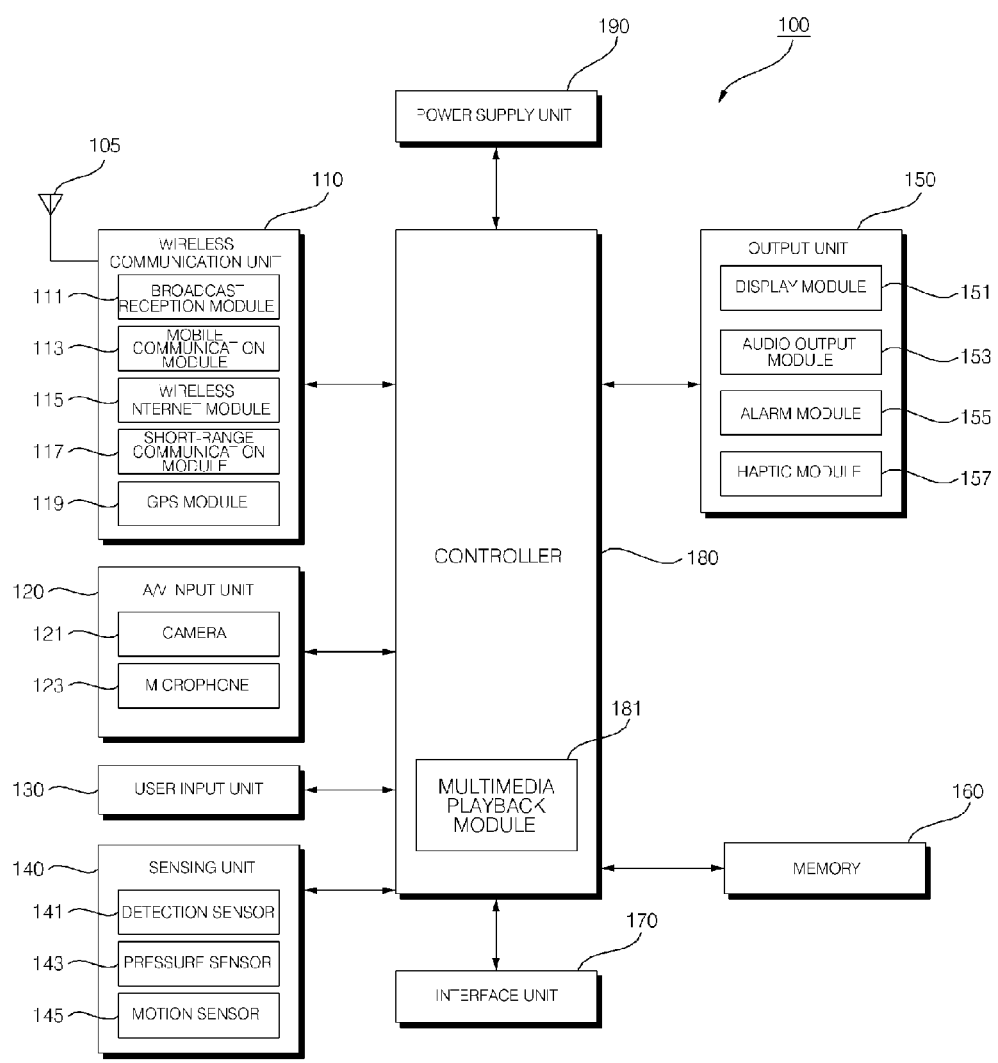
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receive wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HS-DPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia playback module 181, which plays multimedia data. The multimedia playback module 181 may be implemented as a hardware device and may be installed in the controller 180. Alternatively, the multimedia playback module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

Figure 2:
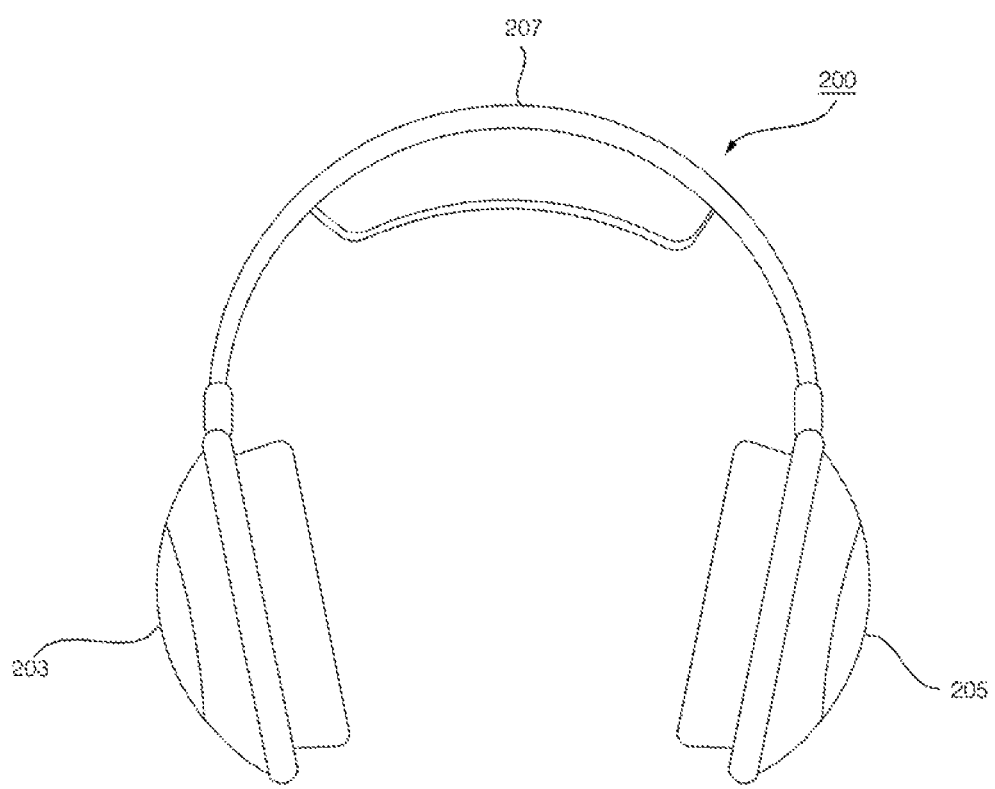
FIG. 2 illustrates a schematic diagram of an audio output device that can be connected to the mobile terminal shown in FIG. 1.

FIG. 2 illustrates a schematic diagram of an audio output device 200 that can be connected to the mobile terminal 100. Referring to FIG. 2, the audio output device 200 may include a frame 207 and first and second audio output units 203 and 205, which are provided on the left and right sides of the audio output device 200 and are connected to the frame 207, and can be worn on the head of the user.

The audio output device 200 may be connected to the mobile terminal 100 using a short-range communication method such as Bluetooth. The audio output device 200 may output an audio signal corresponding to A/V data provided by the mobile terminal 100, and may thus transmit the audio signal directly to the ears of the user.

One of the first and second audio output units 203 and 205 may include a first key (not shown). If the first key is pressed short, the playback of audio data may begin. On the other hand, if the first key is pressed long, the playback of audio data may stop.

One of the first and second audio output units 203 and 205 may include a second key (not shown). If the second key is pressed short, a redial function may be executed. On the other hand, if the second key is pressed long, the volume may be turned up or down.

Figure 3:
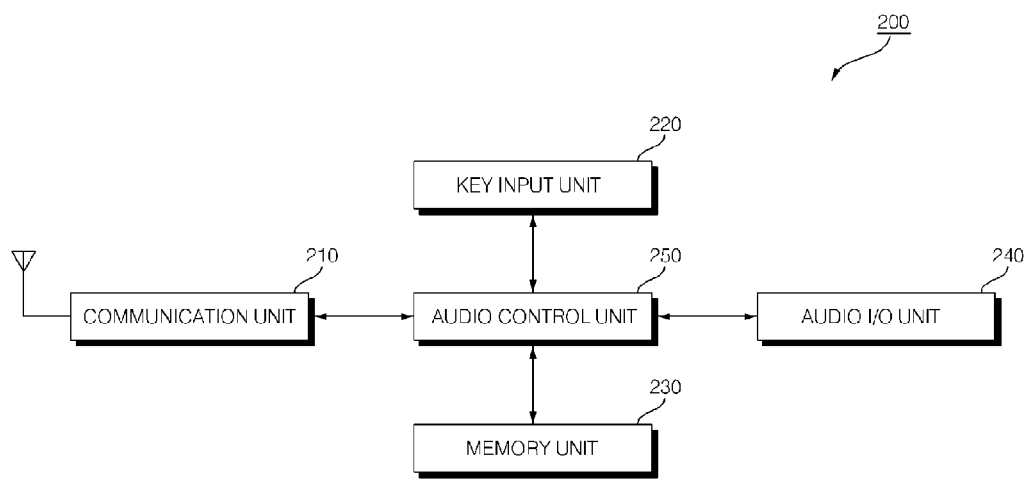
FIG. 3 illustrates a block diagram of the audio output device shown in FIG. 2.

FIG. 3 illustrates a block diagram of the audio output device 200. Referring to FIG. 3, the audio output device 200 may include a communication unit 210, a key input unit 220, a memory unit 230, an audio I/O unit 240 and an audio control unit 250.

The communication unit 210 may provide a wireless communication interface for wirelessly communicating with the mobile terminal 100. The key input unit 220 may include a plurality of keys for playing back audio/video data, terminating the playback of audio/video data and adjusting volume. The memory unit 230 may store various programs or data necessary for operating the audio output device 200. The audio I/O unit 240 may amplify an output audio signal, and may output the amplified audio signal via a speaker. In addition, the audio I/O unit 240 may amplify an audio signal input thereto via a microphone and may transmit the amplified audio signal to the mobile terminal 100.

The audio control unit 250 may control the other units of the audio output device 200. More specifically, the audio control unit 250 may allow the audio output device 200 to transmit various data to or receive various data from the mobile terminal 100 via the communication unit 210. In addition, the audio control unit 250 may allow the audio I/O unit 240 to control various audio signals or adjust gain. Moreover, the audio control unit 250 may read data from or write data to the memory unit 230.

The audio output device 200 may output an audio signal corresponding to A/V data provided by the mobile terminal 100, and may transmit an audio signal input thereto via the audio I/O unit 240 to the mobile terminal 100.

The operation of the mobile terminal 100 may be controlled using a Bluetooth profile such as Headset Profile (HSP), Hands Free Profile (HFP), Advanced Audio Distribution Profile (A2DP), or Audio/Video Remote Control Profile (AVRCP). A Bluetooth profile may be largely classified into a profile for making or receiving calls or a profile for listening to music, and may specify a number of protocols to be used and how to use the protocols.

HSP and HFP, which are profiles for making or receiving calls, support such functions as answering a call, hanging up and redialing. In particular, HSP is the most commonly used profile for providing audio data or mono music, and is generally adopted by Bluetooth mono headsets. HFP is an improved version of HSP, and supports voice dialing, redialing, switching a call, answering a call and hanging up.

HSP and HFP allow the transfer of mono sounds and the use of various hands-free functions such as answering a call, hanging up and redialing. Most mono Bluetooth headsets implement both HSP and HFP.

A2DP and AVRCP allow the transfer of stereo sounds and support such functions as playing audio data, terminating the playback of audio data, and adjusting volume. A2DP is a profile for supporting stereo music, and is designed to transmit a stereo audio stream such as music from an MP3 player to a headset or a car audio system.

AVRCP, which is a profile for supporting a remote control, is designed to provide a standard interface to control, for example, TVs and Hi-Fi equipment, and to allow a single remote control to control all of the A/V equipment to which a user has access.

A2DP includes Audio/Video Distribution Transport Protocol (AVDTP), and AVRCP includes Audio/Video Control Transport Protocol (AVCTP). Stereo Bluetooth headsets implement both A2DP and AVRCP and thus provide various remote control functions such as 'play,' 'pause,' 'play next track,' 'play previous track,' 'volume up,' and 'volume down.'

Audio output devices such as Bluetooth stereo headsets are generally equipped with a function key for controlling A2DP or AVRCP and a function key for controlling HSP or HFP. In general, A2DP or AVRCP may be allocated to a Play key, whereas HSP or HFP may be allocated to a Volume key or a Redial key.

There are other various Bluetooth profiles such as Phone Book Access Profile (PBAP) for providing a phonebook feature in a car kit, and Object Push Profile (OPP) and File Transfer Profile (FTP) for sending files.

When the mobile terminal 100 attempts to connect to the audio output device 200, a list of profiles that are supported by the audio output device 200 may be readily provided to the mobile terminal 100, and thus, the mobile terminal 100 may be able to connect to the audio output device 200 using the profile list. The audio output device 200 may be connected to the mobile terminal 100 using an automatic method or a manual method. When using the automatic method, the audio output device 200 may be automatically connected to the most recently-connected mobile terminal as soon as powered on. On the other hand, when using the manual method, the audio output device 200 may be manually connected to the most recently-connected mobile terminal by pressing a predetermined key of the audio output device 200.

Figure 4:
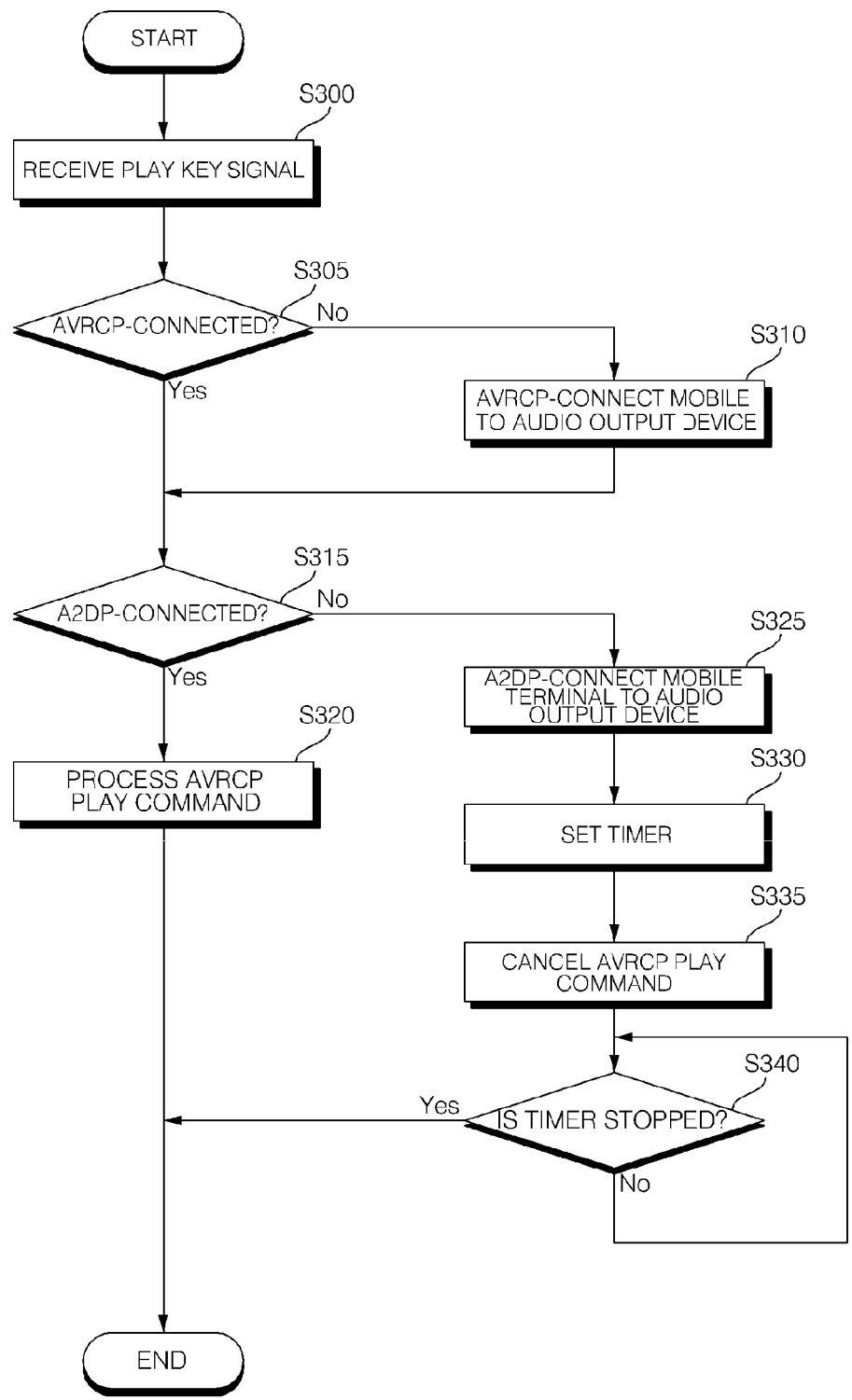
FIGS. 4 through 6 illustrate flowcharts of a method of controlling the operation of a mobile terminal according to an exemplary embodiment of the present invention.
Figure 5:
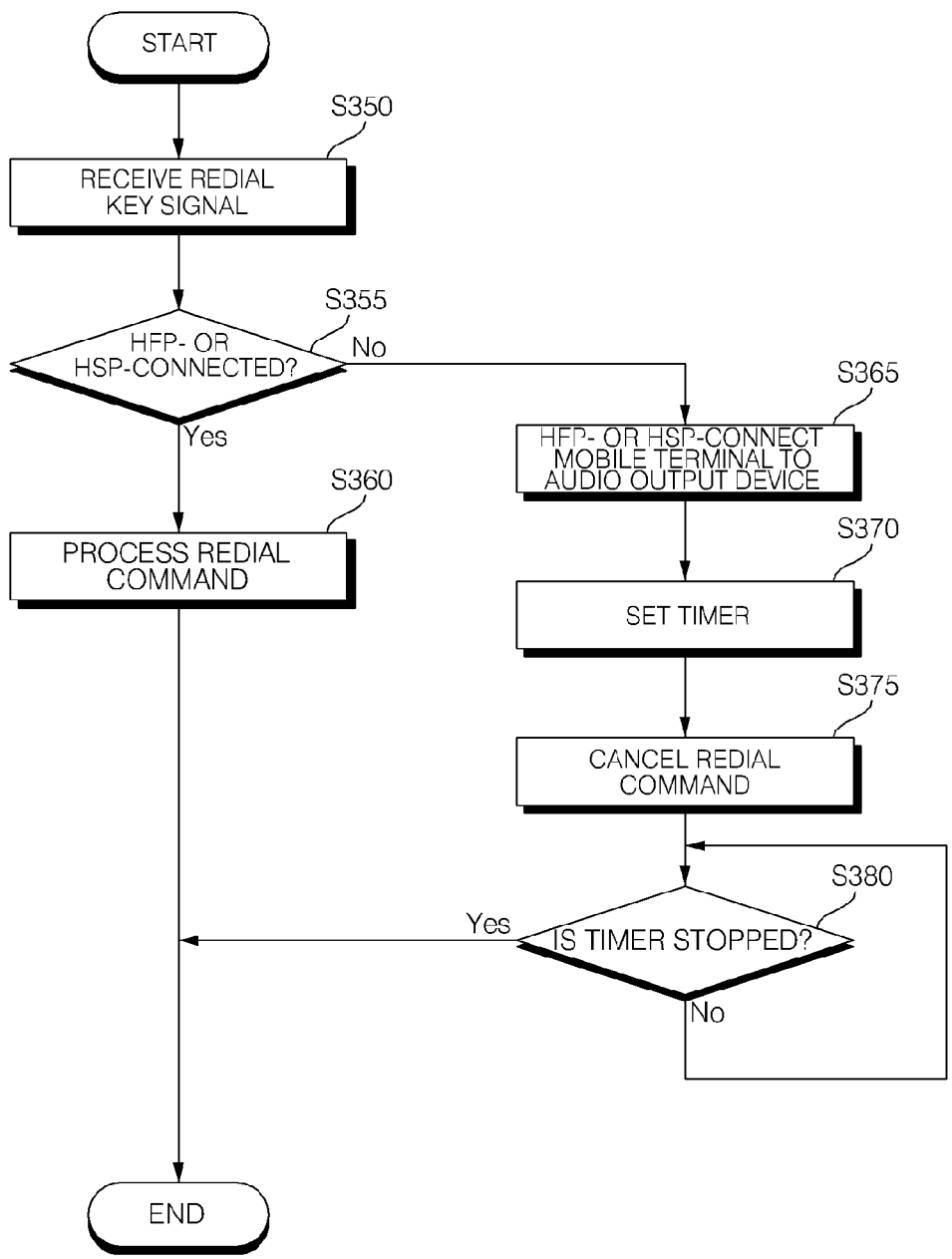
Figure 6:
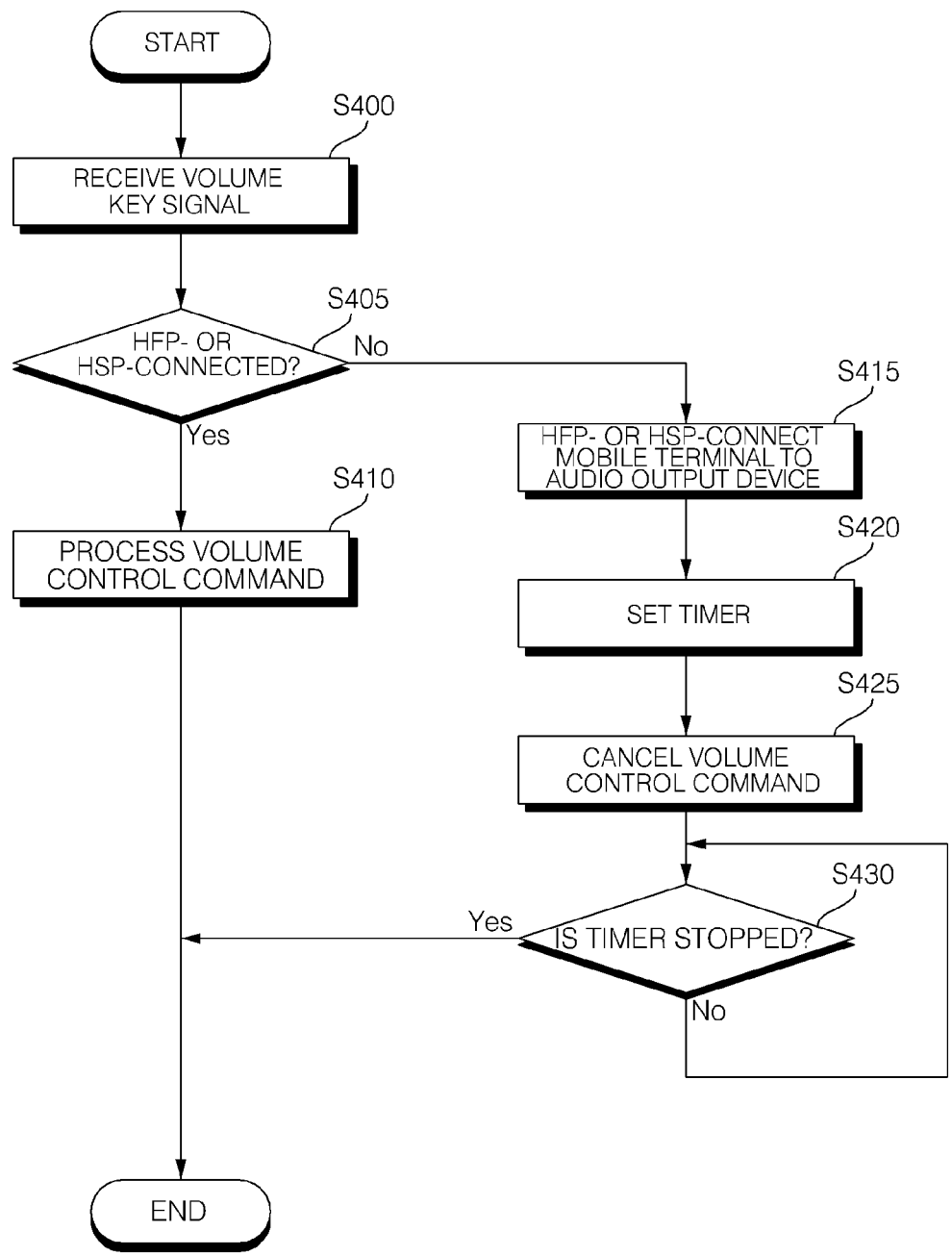

FIGS. 4 through 6 illustrate flowcharts of a method of controlling the operation of a mobile terminal according to an exemplary embodiment of the present invention.

More specifically, FIG. 4 illustrates how to control the operation of the mobile terminal 100 when a Play key signal is received. Referring to FIG. 4, if a Play key signal, which is generated by pressing a Play key of the audio output device 200, is received via short-range communication, the controller 180 of the mobile terminal 100 may determine whether the mobile terminal 100 is AVRCP-connected to the audio output device 200 (S305). If it is determined in operation 5305 that the mobile terminal 100 is not AVRCP-connected to the audio output device 200, the controller 180 may control the mobile terminal 100 to be AVRCP-connected to the audio output device 200 (S310).

Thereafter, the controller 180 may determine whether the mobile terminal 100 is AVRCP-connected to the audio output device 200 (S315). Thereafter, if it is determined in operation 5315 that the mobile terminal 100 is A2DP-connected to the audio output device 200, the controller 180 may control an AVRCP Play command to be processed normally (S320). As a result, an A2DP stream may be transmitted from the mobile terminal 100 to the audio output device 200 and may thus be output through the audio output device 200.

On the other hand, if it is determined in operation 5315 that the mobile terminal 100 is not A2DP-connected to the audio output device 200, the controller 180 may control the mobile terminal 100 to be A2DP-connected to the audio output device 200 (S325), may set a timer (S330), and may cancel the AVRCP Play command (S335). Thereafter, the controller 180 may stand by until the timer is stopped (S340). That is, the processing of the AVRCP Play command may be stopped for a predetermined amount of time set by the timer in order to prevent the generation of noise or the malfunction of the mobile terminal 100, which can be caused by readily executing a Play command as soon as the mobile terminal 100 is connected to the audio output device 200 using A2DP, without waiting for a sound path to be properly established in the mobile terminal 100.

In short, when the audio output device 200 attempts to connect to the mobile terminal 100, it is possible to prevent the malfunction of the mobile terminal 100 by stopping the processing of a Play command for a set amount of time.

FIG. 5 illustrates how to control the operation of the mobile terminal 100 when a Redial key signal is received. Referring to FIG. 5, if a Redial key signal is received (S350), the controller 180 may determine whether the mobile terminal 100 is HFP- or HSP-connected to the audio output device 200 (S355). Thereafter, if it is determined in operation 5355 that the mobile terminal 100 is HFP- or HSP-connected to the audio output device 200, the controller 180 may control a Redial command to be processed normally (S360). As a result, a previously-dialed number may be redialed.

On the other hand, if it is determined in operation S355 that the mobile terminal 100 is not HFP- or HSP-connected to the audio output device 200, the controller 180 may control the mobile terminal 100 to be HFP- or HSP-connected to the audio output device 200 (S365), may set a timer (S370), and may cancel the Redial command (S375). Thereafter, the controller 180 may stand by until the timer is stopped (S380). As a result, the processing of the Redial command may be stopped for a predetermined amount of time set by the timer.

In this manner, it is possible to prevent a previously-dialed number from being redialed in response to a Redial command input to the mobile terminal 100 when the mobile terminal 100 is yet to be connected to the audio output device 200 and thus to prevent the user from engaging in an unwanted call.

FIG. 6 illustrates how to control the operation of the mobile terminal 100 when a volume key signal is received. Referring to FIG. 6, if a volume key signal is received (S400), the controller 180 may determine whether the mobile terminal 100 is HFP- or HSP-connected to the audio output device 200 (S405). If it is determined in operation 5405 that the mobile terminal 100 is HFP- or HSP-connected to the audio output device 200, the controller 180 may control a volume control command to be processed normally (S410). As a result, the volume of an audio signal may be controlled properly in response to the volume control command.

On the other hand, if it is determined in operation 5405 that the mobile terminal 100 is not HFP- or HSP-connected to the audio output device 200, the controller 180 may control the mobile terminal 100 to be HFP- or HSP-connected to the audio output device 200 (S415), may set a timer (S420), and may cancel the volume control command (S425). Thereafter, the controller 180 may stand by until the timer is stopped (S430). As a result, the processing of the volume control may be stopped for a predetermined amount of time set by the timer.

In this manner, it is possible to prevent the generation of noise or silence, which can be caused by readily performing volume control as soon as the mobile terminal 100 is A2DP-connected to the audio output device 200, without waiting for a sound path to be properly established in the mobile terminal 100.

Figure 7A:
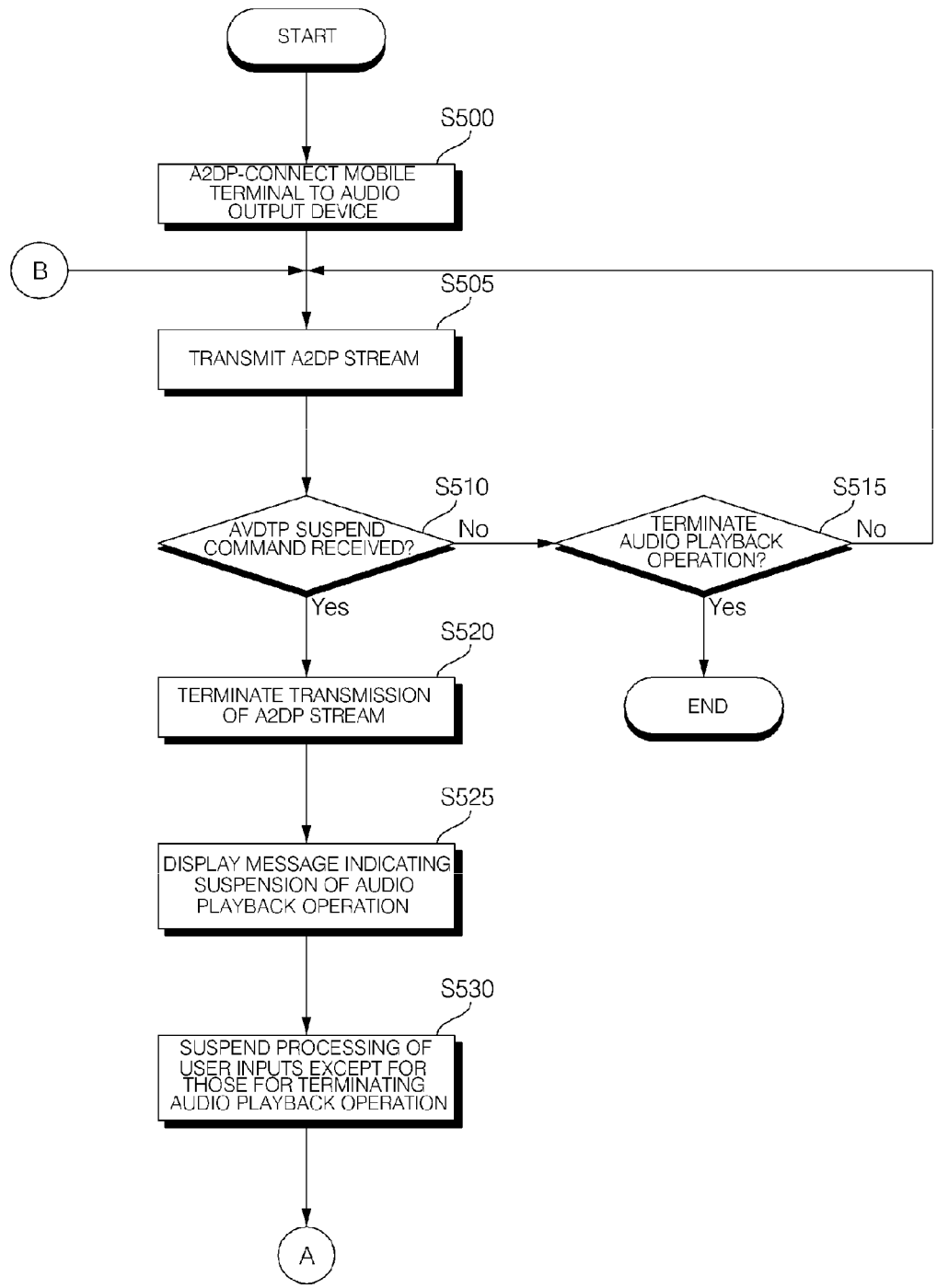
FIGS. 7A and 7B illustrate flowcharts of a method of controlling the operation of a mobile terminal according to another exemplary embodiment of the present invention.
Figure 7B:
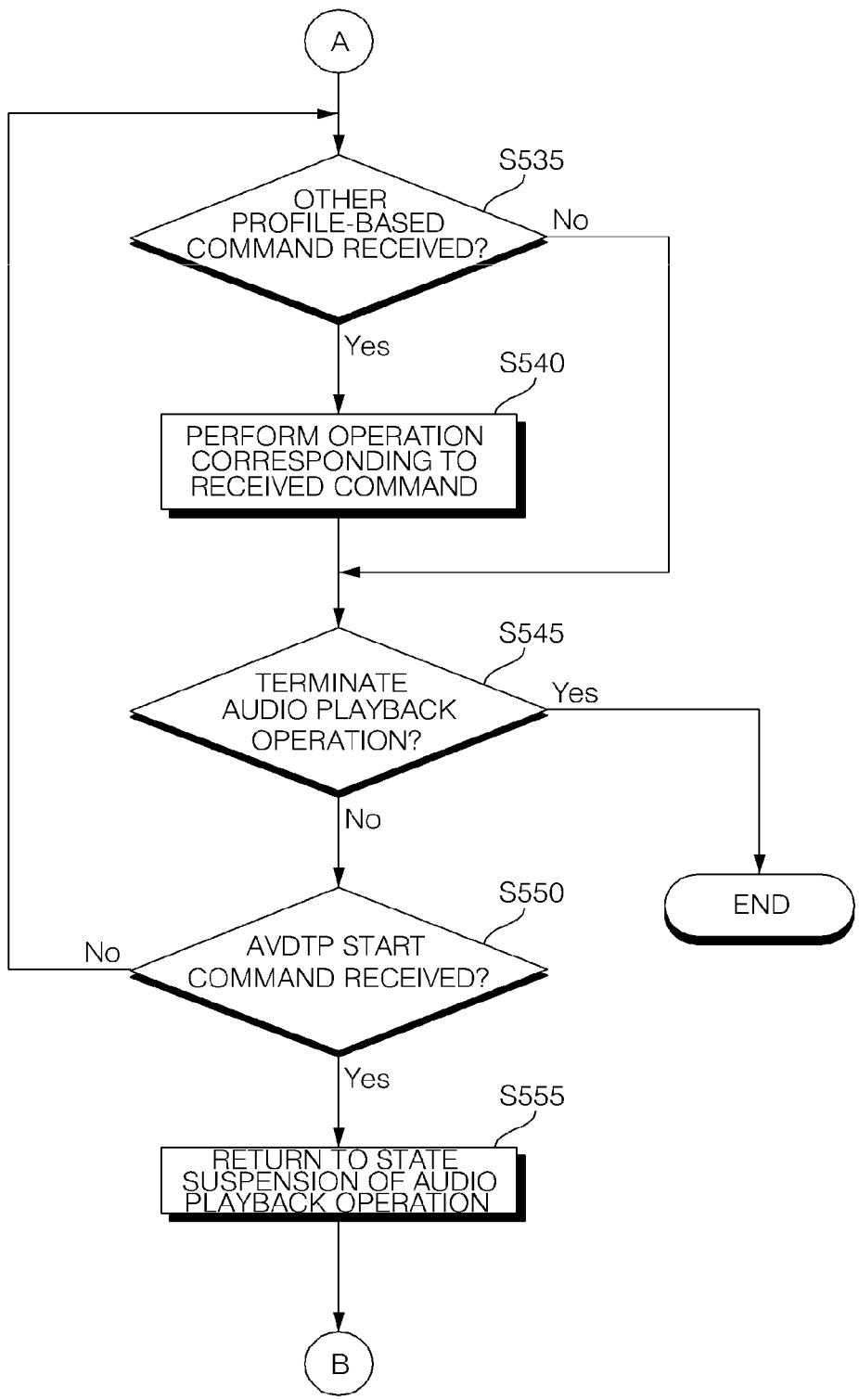

FIGS. 7A and 7B illustrate flowcharts of a method of controlling the operation of a mobile terminal according to another exemplary embodiment of the present invention. Referring to FIG. 7A, if a Play key of the audio output device 200 is pressed or a user input is received, the controller 180 may connect the mobile terminal 100 to be A2DP-connected to the audio output device 200 via the wireless communication unit 110 (S500). Thereafter, the controller 180 may play a predetermined file selected by the user and may thus transmit an A2DP stream to the audio output device 200 (S505).

If an AVDTP Suspend command requesting the transmission of the A2DP stream to be suspended is received during the transmission of the A2DP stream (S510), the controller 180 may stop the transmission of the A2DP stream (S520).

The AVDTP Suspend command may be used to suspend an audio playback operation during the execution of a phonebook function, a call history function and an SMS search function, during the use of PBAP or during the transmission of a file or data such as vCard to the audio output device 200 using OPP or FTP.

Thereafter, the controller 180 may display a message indicating that the playback of the selected file has been suspended on the display module 151 (S525). Thereafter, the controller 180 may suspend the processing of all user inputs regarding the control of an audio playback operation except for those for terminating the audio playback operation (S530). That is, even if a key input or touch input for performing an operation associated with the playback of the selected file such as rewinding or fast-forwarding the selected file is received, the controller 180 may control the operation associated with the playback of the selected file not to be performed unless the operation associated with the playback of the selected file is terminating the playback of the selected file.

The processing of all AVRCP-related commands may also be suspended in response to the AVDTP Suspend command. As a result, such commands as Play, Pause, Fast Forward, Rewind, Forward, or Backward cannot be transmitted from the audio output device 200 to the mobile terminal 100.

Even if the AVDTP Suspend command is yet to be received, the controller 180 may terminate the playback of the selected file if the user chooses the playback of the selected file to be terminated using the Mobile terminal 100 (S515).

Referring to FIG. 7B, if a command based on other profiles is received (S535), the controller 180 may control an operation corresponding to the received command to be performed (S540). Examples of the received command include a command for performing an HSP- or HFP-based call function or volume control function, a command for searching a phonebook, viewing a call history, viewing a list of SMS messages, and a command for sending a file or data such as vCard from the audio output device 200 to the mobile terminal 100 using OPP or FTP.

If the user chooses the playback of the selected file to be terminated (S545), the method ends.

On the other hand, if an AVDTP Start command, which is a command to initiate the playback of the selected file, is received from the audio output device 200 (S550), the controller 180 may return the mobile terminal 100 to its original state before the reception of the AVDTP Suspend command (S550), and the method returns to operation 5505. As a result, the message displayed in operation 5525 may disappear from the display module 151, and all user inputs regarding the control of the audio playback operation except for those for terminating the audio playback operation may be processed normally. In addition, the audio output device 200 may resume outputting an audio signal.

In this manner, it is possible to suspend the transmission of an audio stream and resume transmitting the audio stream where left off.

Figure 8A:
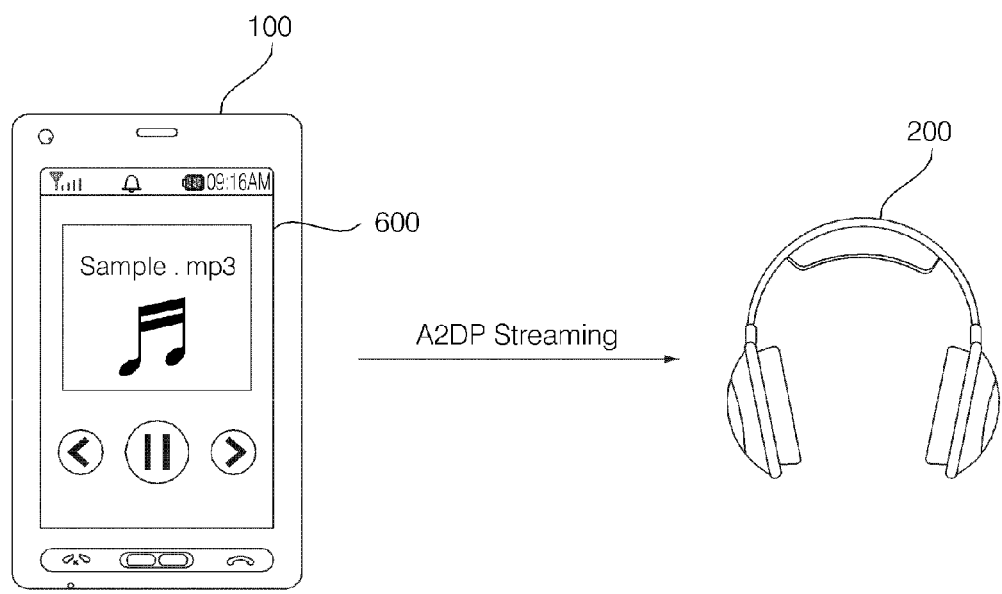
FIGS. 8A and 8B illustrate diagrams for explaining how to transmit an audio stream from the mobile terminal shown in FIG. 1 to the audio output device shown in FIG. 2.
Figure 8B:
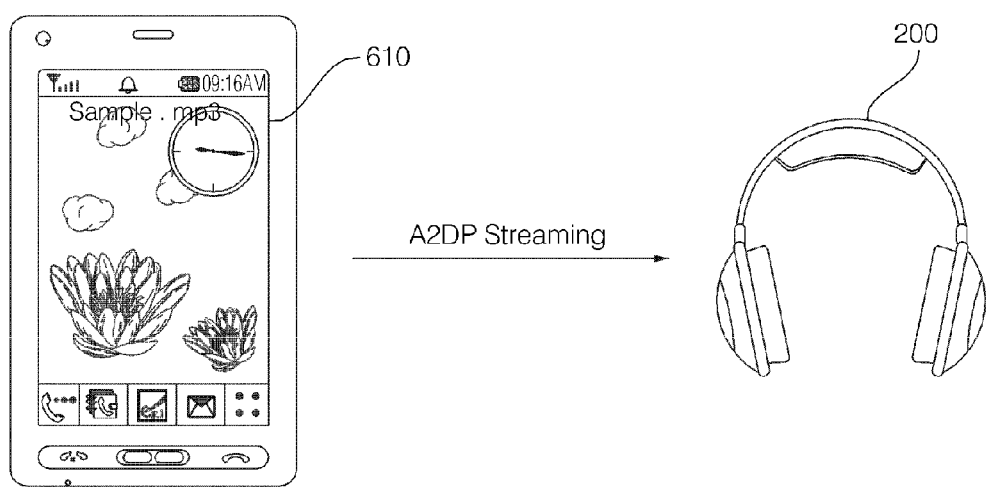

FIGS. 8A and 8B illustrate diagrams for explaining the transmission of an audio stream between the mobile terminal 100 and the audio output device 200. Referring to FIG. 8A, during a multimedia playback mode, the mobile terminal 100 may be connected to the audio output device 200 via short-range communication and may thus transmit an A2DP stream to the audio output device 200. In this case, a screen 600 corresponding to the multimedia playback mode may be displayed on the display module 151.

During the connection of the mobile terminal 100 to the audio output device 200, the processing of various commands may be suspended, and a predetermined message may be displayed on the display module 151 in order to alert the user. During the connection of the mobile terminal 100 to the audio output device 200, such commands as a Play command and a Redial command may not be transmitted from the audio output device 200 to the mobile terminal 100.

Referring to FIG. 8B, when a predetermined file selected by the user is being played in a background mode, information regarding the selected file may be displayed on a certain part of a screen 610 corresponding to a current operating state of the mobile terminal 100.

Figure 9A:
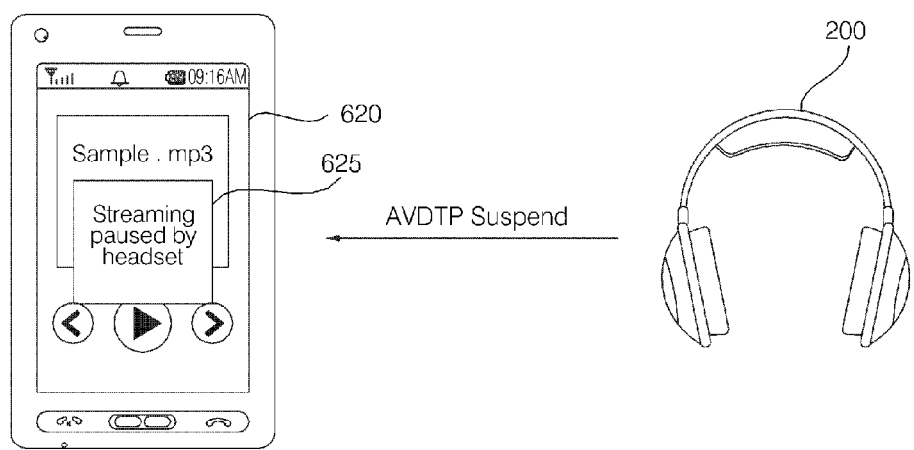
FIGS. 9A and 9B illustrate diagrams for explaining the operation of the mobile terminal shown in FIG. 1 when an Audio/Video Distribution Transport Protocol (AVDTP) Suspend command is received from the audio output device shown in FIG. 2.
Figure 9B:
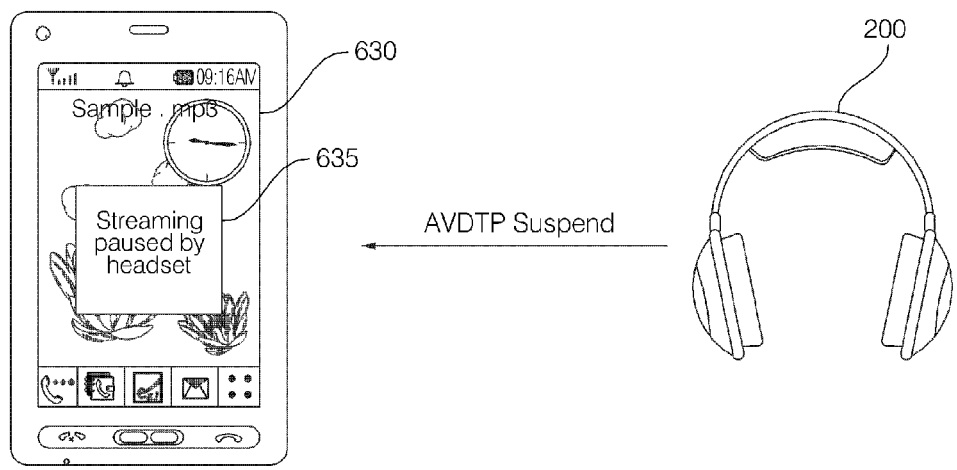

FIGS. 9A and 9B illustrate diagrams for explaining how to control the operation of the mobile terminal 100 when an AVDTP Suspend command is received. Referring to FIG. 9A, if the AVDTP Suspend command is received during the playback of an audio file, a message 625 indicating that the playback of the audio file has been suspended may be displayed on a multimedia playback screen 620, and the processing of all user inputs regarding the control of the playback of the audio file except for those for terminating the playback of the audio file may be suspended.

Referring to FIG. 9B, if the AVDTP Suspend command is received during the playback of an audio file in a background mode, a message 635 indicating that the playback of the audio file has been suspended may be displayed on a screen 430 corresponding to a current operating state of the mobile terminal 100. In this case, like in the case of FIG. 9A, the processing of all user inputs regarding the control of the playback of the audio file except for those for terminating the playback of the audio file may be suspended.

Figure 10A:
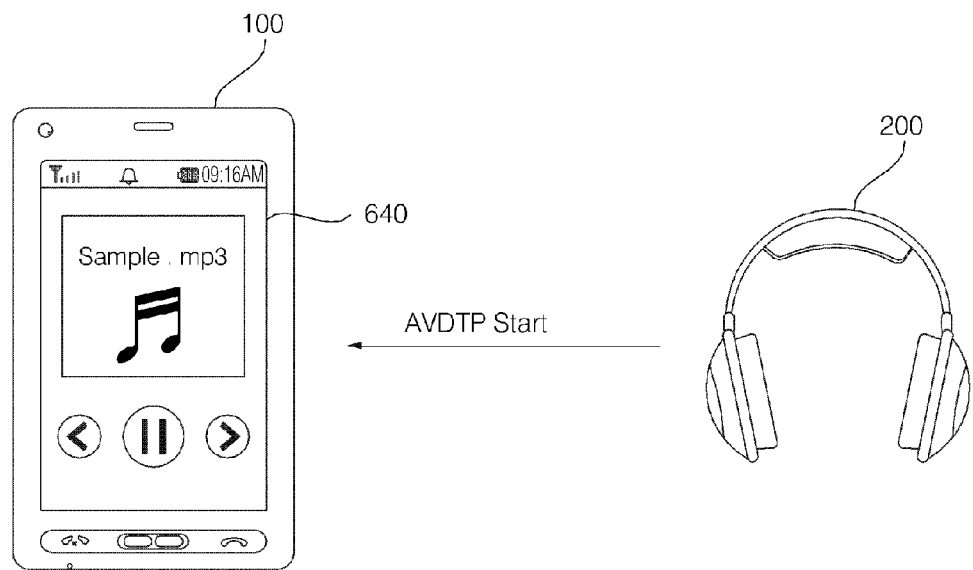
FIGS. 10A and 10B illustrate diagrams for explaining the operation of the mobile terminal shown in FIG. 1 when an AVDTP Start command is received from the audio output device shown in FIG. 2.
Figure 10B:
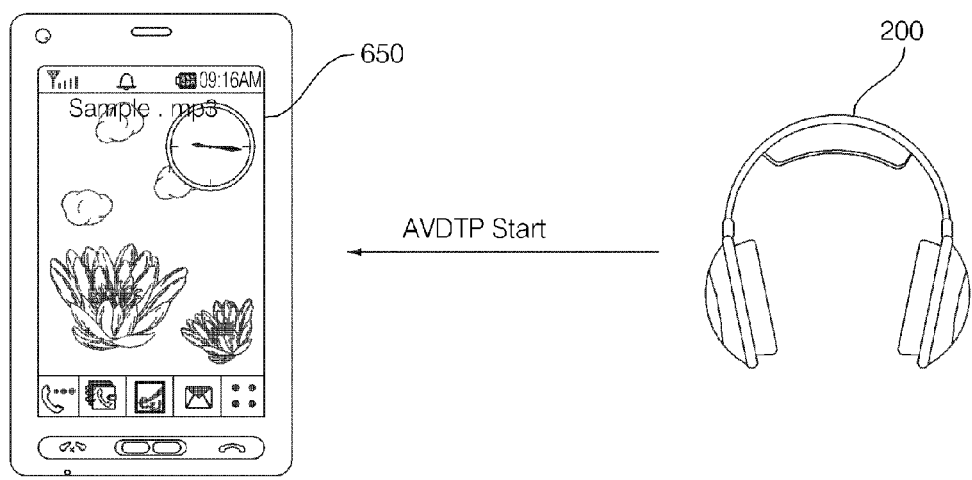

FIGS. 10A and 10B illustrate diagrams for explaining how to control the operation of the mobile terminal 100 when an AVDTP Start command is received. Referring to FIG. 10A, if the AVDTP Start command is received when the playback of an audio file is suspended, the same screen as that displayed before the suspension of the playback of the audio file, i.e., a screen 640, may be displayed on the display module 151, and all user inputs regarding the control of the playback of the audio file may be processed normally. In addition, the transmission of an audio stream may be resumed.

Similarly, referring to FIG. 10B, if the AVDTP Start command is received when the playback of an audio file in a background mode is suspended, the same screen as that displayed before the suspension of the playback of the audio file, i.e., a screen 650, may be displayed on the display module 151, and all user inputs regarding the control of the playback of the audio file may be processed normally. In addition, the transmission of an audio stream may be resumed.

In short, if the AVDTP Start command is received when the playback of an audio file is suspended, the mobile terminal 100 may return to its original state before the suspension of the playback of the audio file and may thus resume transmitting an audio stream to the audio output device 200.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, the processing of a number of commands such as a Play command, a Redial command, and a volume control command may be suspended for a predetermined amount of time after the connection of a mobile terminal to an audio output device via short-range communication. Thus, it is possible to prevent noise or silence from being generated or an operation not intended by a user from being performed.

In addition, if a command to suspend the playback of an audio file is received when the mobile terminal is connected to the audio output device, the transmission of an audio stream may be suspended, a message indicating the suspension of the transmission of the audio stream may be displayed, and the processing of all user inputs regarding the control of the playback of the audio file except for those for terminating the playback of the audio file may be suspended. Therefore, it is possible to properly perform an operation requested by the audio output device during the playback of the audio file.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an operation of a mobile terminal configured to be connected to an audio output device via short-range communication, the method comprising:
   receiving a command via a first key signal from the audio output device, the first key signal configured to control an audio playback operation and a first profile configured to play audio data;
   determining if the mobile terminal is connected to the audio output device using the first profile;
   connecting the mobile terminal to the audio output device via the short-range communication using the first profile and initiating a timer upon the connecting of the mobile terminal to the audio output device when it is determined that the mobile terminal is not connected to the audio output device using the first profile; and
   suspending processing of a command corresponding to the first key signal for a predetermined time after connecting the mobile terminal to the audio output device using the first profile.

2. The method of claim 1, further comprising continuing the processing of the command corresponding to the first key signal when it is determined that the mobile terminal is already connected to the audio output device using the first profile.

3. The method of claim 1, wherein the first profile comprises an Advanced Audio Distribution Profile (A2DP) or an Audio/Video Remote Control Profile (AVRCP).

4. The method of claim 1, further comprising:
   receiving a command via a second key signal from the audio output device, the second key signal controlling a second profile configured to make or receive a voice call and a redial operation or a volume control operation;

determining if the mobile terminal is connected to the audio output device using the second profile;

connecting the mobile terminal to the audio output device via the short-range communication using the second profile when it is determined that the mobile terminal is not connected to the audio output device using the second profile; and suspending processing of a command corresponding to the second key signal for a time after connecting the mobile terminal to the audio output device using the second profile.

5. The method of claim 4, further comprising continuing the processing of the command corresponding to the second key signal when it is determined that the mobile terminal is already connected to the audio output device using the second profile.

6. The method of claim 4, wherein the second profile comprises a Headset Profile (HSP) and a Hands Free Profile (HFP).

7. The method of claim 1, further comprising outputting an audio signal corresponding to an audio stream provided by the audio output device.

8. The method of claim 1, further comprising:
transmitting an audio stream to the audio output device;
performing audio playback through the audio output device;
receiving a first command from the audio output device to suspend the audio playback;
suspending the transmission of the audio stream;
displaying a message indicating the suspension of the transmission of the audio stream on a display module of the mobile terminal; and
suspending all user inputs related to control of the audio playback except for those related to terminating the audio playback,
wherein the first profile is configured for distributing the audio stream.

9. The method of claim 8, wherein the command to suspend the audio playback comprises an Audio/Video Distribution Transport Protocol (AVDTP) Suspend command.

10. The method of claim 8, further comprising:
receiving a second command from the audio output device to resume the audio playback;
returning to a state that existed before the reception of the first command in order to suspend the audio playback; and
resuming the transmission of the audio stream.

11. The method of claim 8, wherein the first profile comprises an Advanced Audio Distribution Profile (A2DP).

12. The method of claim 8, further comprising:
connecting the mobile terminal to the audio output device using a second profile; and
performing an operation corresponding to a command based on the second profile.

13. The method of claim 12, wherein the second profile comprises a Phone Book Access Profile (PBAP), an Object Push Profile (OPP), a File Transfer Profile (FTP), a Headset Profile (HSP) or a Hands Free Profile (HFP).

14. The method of claim 8, further comprising:
receiving a third command to terminate audio playback; and
terminating the transmission of the audio stream.

15. A mobile terminal, comprising:
a wireless communication unit configured to connect the mobile terminal to an audio output device via short-range communication; and a controller configured to:
receive a command via a first key signal from the audio output device, the first key signal configured to control an audio playback operation from the audio output device and a first profile configured to play audio data;
determine if the mobile terminal is connected to the audio output device using the first profile;
connect the mobile terminal to the audio output device via the short-range communication using the first profile and initiate a timer upon the connecting of the mobile terminal to the audio output device when it is determined that the mobile terminal is not connected to the audio output device using the first profile; and
suspend processing of a command corresponding to the first key signal for a predetermined time after connecting the mobile terminal to the audio output device using the first profile.

16. The mobile terminal of claim 15, wherein the controller is further configured to continue to process the command corresponding to the first key signal when it is determined that the mobile terminal is already connected to the audio output device using the first profile.

17. The mobile terminal of claim 15, wherein the first profile comprises an Advanced Audio Distribution Profile (A2DP) and an Audio/Video Remote Control Profile (AVRCP).

18. The method of claim 15, wherein the controller is further configured to:
receive a command via a second key signal from the audio output device, the second key signal controlling a second profile configured to make or receive a voice call and a redial operation or a volume control operation;
determine if the mobile terminal is connected to the audio output device using the second profile;
connect the mobile terminal to the audio output device using the second profile via the short-range communication when it is determined that the mobile terminal is not connected to the audio output device using the second profile; and
suspend processing of a command corresponding to the second key signal for a time after connecting the mobile terminal to the audio output device using the second profile.

19. The mobile terminal of claim 18, wherein the second profile comprises a Headset Profile (HSP) and a Hands Free Profile (HFP).

20. The mobile terminal of claim 15, further comprising:
a display module,
wherein the controller is further configured to:
transmit an audio stream to the audio output device;
perform audio playback through the audio output device;
receive a first command from the audio output device to suspend the audio playback;
suspend the transmission of the audio stream; and
display a message on the display module indicating the suspension of the transmission of the audio stream, and
wherein the first profile is configured for distributing the audio stream.

21. The mobile terminal of claim 20, wherein the command to suspend the audio playback comprises an Audio/Video Distribution Transport Protocol (AVDTP) Suspend command.

22. The mobile terminal of claim 20, wherein the controller is further configured to suspend all user inputs related to the control of the audio playback except for those related to terminating the audio playback.

23. The mobile terminal of claim 22, wherein the controller is further configured to:
receive a second command from the audio output device to resume the audio playback;
return to a state that existed before the reception of the command in order to suspend the audio playback; and
resume the transmission of the audio stream.

24. The mobile terminal of claim 22, wherein the first profile comprises an Advanced Audio Distribution Profile (A2DP).

25. A system, comprising:
an audio output device comprising a first key configured to generate a command via a first key signal when the first key is activated, the first key signal configured to control an audio playback operation and a first profile configured to play audio data; and
a mobile terminal configured to:
receive the command via the first key signal from the audio output device;
determine if the mobile terminal is connected to the audio output device using the first profile;
connect the mobile terminal to the audio output device via the short-range communication using the first profile and initiate a timer upon the connecting of the mobile terminal to the audio output device when it is determined that the mobile terminal is not connected to the audio output device using the first profile; and
suspend processing of a command corresponding to the first key signal for a predetermined time after connecting the mobile terminal to the audio output device using the first profile.

26. A method of controlling an operation of a mobile terminal configured to be connected to an audio output device via short-range communication, the method comprising:
receiving a command via a key signal from the audio output device, the key signal configured to control an operation of the mobile terminal;
determining if the mobile terminal is connected to the audio output device using a predetermined profile;
connecting the mobile terminal to the audio output device via the short-range communication using the predetermined profile and initiating a timer upon the connecting of the mobile terminal to the audio output device when it is determined that the mobile terminal is not connected to the audio output device using the predetermined profile; and
suspending processing of a command corresponding to the key signal for a predetermined time after connecting the mobile terminal to the audio output device using the predetermined profile.

27. The method of claim 26, wherein:
the key signal is configured to control a call operation, a redial operation or a volume adjustment operation; and
the predetermined profile is configured to make or receive a voice call.

28. A mobile terminal, comprising:
a wireless communication unit configured to connect the mobile terminal to an audio output device via short-range communication; and
a controller configured to:
receive a command via a key signal from the audio output device, the key signal configured to control an operation of the mobile terminal;
determine if the mobile terminal is connected to the audio output device using a predetermined profile;
connect the mobile terminal to the audio output device via the short-range communication using the predetermined profile and initiate a timer upon the connecting of the mobile terminal to the audio output device when it is determined that the mobile terminal is not connected to the audio output device using the predetermined profile; and
suspend processing of a command corresponding to the key signal for a predetermined time after connecting the mobile terminal to the audio output device using the predetermined profile.

29. The mobile terminal of claim 28, wherein:
the key signal is configured to control a call operation, a redial operation or a volume adjustment operation; and
the predetermined profile is configured to make or receive a voice call.

* * * * *